US010755377B2

(12) United States Patent
Beunardeau

(10) Patent No.: US 10,755,377 B2
(45) Date of Patent: Aug. 25, 2020

(54) METHOD FOR PROCESSING DISPLAY DATA, CORRESPONDING DEVICE AND PROGRAM

(71) Applicant: INGENICO GROUP, Paris (FR)

(72) Inventor: Marc Beunardeau, Paris (FR)

(73) Assignee: INGENICO GROUP, Paris (FR)

( * ) Notice: Subject to any disclaimer, the term of this patent is extended or adjusted under 35 U.S.C. 154(b) by 114 days.

(21) Appl. No.: 16/168,161

(22) Filed: Oct. 23, 2018

(65) Prior Publication Data

US 2019/0122331 A1    Apr. 25, 2019

(30) Foreign Application Priority Data

Oct. 23, 2017  (FR) ...................................... 17 59960

(51) Int. Cl.
| | | |
|---|---|---|
| *G06T 3/00* | (2006.01) | |
| *G06F 3/147* | (2006.01) | |
| *G06F 21/36* | (2013.01) | |
| *G09G 5/14* | (2006.01) | |
| *G06F 3/0488* | (2013.01) | |
| *G06F 17/11* | (2006.01) | |
| *G06F 21/62* | (2013.01) | |

(52) U.S. Cl.
CPC .......... *G06T 3/0093* (2013.01); *G06F 3/0488* (2013.01); *G06F 3/147* (2013.01); *G06F 17/11* (2013.01); *G06F 21/36* (2013.01); *G06F 21/6245* (2013.01); *G09G 5/14* (2013.01); *G09G 2340/14* (2013.01); *G09G 2340/145* (2013.01); *G09G 2358/00* (2013.01)

(58) Field of Classification Search
CPC ........ G06F 3/0488; G06F 21/36; G06F 3/147; G06F 21/6245; G06F 17/11; G09G 2358/00; G09G 2340/145; G09G 2340/14; G09G 5/14; G06T 3/0093
See application file for complete search history.

(56) References Cited

FOREIGN PATENT DOCUMENTS

| | | |
|---|---|---|
| EP | 2023333 A2 | 2/2009 |
| FR | 3023042 A1 | 1/2016 |

OTHER PUBLICATIONS

French Search Report dated Apr. 19, 2018 for corresponding French Application No. 1759960, filed Oct. 23, 2017.
English translation of the French Written Opinion dated Apr. 19, 2018 for corresponding French Application No. 1759960, filed Oct. 23, 2017.

*Primary Examiner* — Christopher Wait
(74) *Attorney, Agent, or Firm* — David D. Brush; Westman, Champlin & Koehler, P.A.

(57) ABSTRACT

A method for processing display data is implemented by an electronic data processing device. The display data represents at least one piece of information to be displayed on a screen. The method includes: for obtaining at least one reference image representing the at least one piece of information to be displayed; and generating at least one altered image from the reference image and from at least one alteration parameter.

10 Claims, 2 Drawing Sheets

METHOD FOR PROCESSING DISPLAY DATA, CORRESPONDING DEVICE AND PROGRAM

Figure 1:
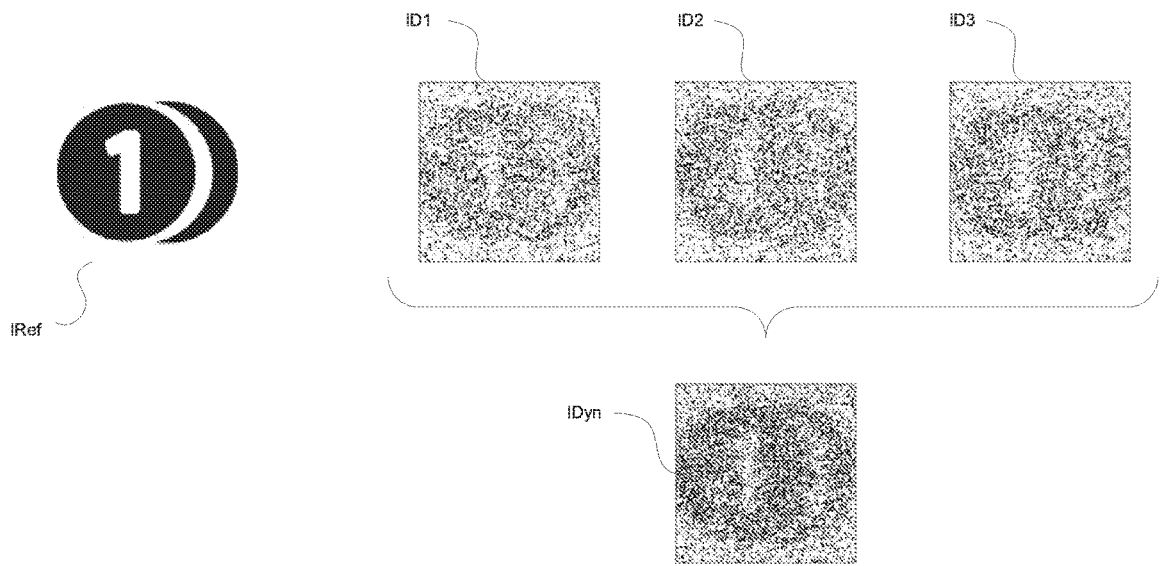

This Application claims priority to and the benefit of French Patent Application No. 1759960, filed Oct. 23, 2017, the content of which is incorporated herein by reference in its entirety.

1. FIELD OF THE INVENTION

The invention relates to the securing of data entry. More particularly, the invention relates to a method for masking information displayed on a screen. It is an object of the invention indeed to secure the entry of sensitive data on to touch-sensitive screens.

2. PRIOR ART

The secured entry of data in modern communication devices represents a genuine challenge. In the case of mobile communications terminals (of the smartphone type), most of which are now equipped with touch-sensitive screens, a user makes his entry by touching the screen. This information is, first of all, processed by the operating system and sent to the appropriate applications. However, many applications manage sensitive data. This is the case for example with payment applications.

The possibility of making a payment by means of a smartphone or tablet type communications terminal has been widely documented, especially ever since communications terminals for the general public have been incorporating secured data-processing environments (secured SIM cards for example). Of the numerous payment methods that have been disclosed, a substantial portion use specific applications that are installed on the communications terminals and enable the saving and use of a plurality of payment cards: the data in the payment card are entered or photographed by means of the communications terminal and saved, at least partially, within the secured environment of the user's communications terminal. When the user wishes to use his communications terminal to pay a merchant, he opens the appropriate application on his communications terminal, selects the payment card that he wishes to use and confirms payment: this confirmation may require the entry of a PIN code type of personal identification code.

Similarly, novel payment terminals also embed touch-sensitive screens that can be used to enter confidential data of the personal identification code (PIN) type: this is the case for example with what are called light payment terminals installed in a merchant's premises and using a touch-sensitive tablet. The touch-sensitive tablet then acts as a cash register and payment terminal in using one or more appropriate applications.

Other securing devices (for example for securing access to buildings, resources etc.) also embed touch-sensitive screens on which the users must enter passwords or access codes.

The widespread use of this type of screen to carry out an entry especially raises a problem of security: malicious individuals have taken advantage of these novel information entry devices to obtain confidential information. This occurs especially on smartphone or tablet type communications terminals. Since the main goal of these terminals is to be user-friendly, multimedia devices, the user has great latitude in the installation of applications. Now many applications embed spy software modules, the aim of which is to obtain information fraudulently.

There are numerous ways by which an adversary may attempt to steal this information:
- long-distance observation of the screen;
- making a malicious application work as an invisible window to relay inputs that a user makes to a legitimate application;
- having a malicious application that examines the memory or the cache memory of the peripheral and maps the modifications obtained on to the user's actions;
- using the analysis of lateral channels or concealed channels (on the user's apparatus) to infer the user's action.

This list is of course not exhaustive. Each of these attacks can be carried out successfully on a present-day communications connection.

In a classic and widely documented countermeasure, the positioning of the keypad keys displayed on the touch-sensitive screen is made random. This is the strategy followed by many solutions with minimum effort. A company known as "myPinPad™" has proposed a mixed or composite virtual keypad such that that users can type out their personal identification codes (and other confidential data), the potential spy applications receiving mixed information. However, this is unsatisfactory at several levels. For example, the proposed solution requires substantial infrastructure. In addition, not all the attacks mentioned here above are covered by the protection it brings if the adversary can obtain just one copy of the image of the screen. Indeed, the major problem with the random keypad is that it effectively enables the securing of the entry made on the screen provided that the adversary cannot obtain a copy of the random keypad. Now, obtaining a screen copy is generally not a complex processing operation and can be carried out by a malicious application. Once the screen copy is obtained, the malicious application can again accurately interpret the entries made by the user.

It is therefore necessary to have available a solution for entering data that resolves this prior art problem and enables a secured entry of data on a touch-sensitive keypad displayed on a screen of a terminal.

3. SUMMARY OF THE INVENTION

The proposed technique does not have these drawbacks of the prior art. More particularly, the proposed technique implements a principle of remanence of display and/or of perception of the information when it is displayed on a screen. This phenomenon is used to generate degraded or altered images which, when viewed, enable the user to guess and/or read the images from the screen. The disclosed technique relates to a smart alteration of the image with a subsequent goal of displaying altered images. The invention however is in no way limited to this sole function of subsequent display but can also be implemented in other types of methods or fields relating to the securing of a piece of information.

More particularly, the invention relates to a method for processing display data, the method being implemented by an electronic data processing device, said display data representing at least one piece of information to be displayed on a screen. According to the invention, such a method comprises:
- a step for obtaining at least one reference image representing said at least one piece of information to be displayed;

a step for generating at least one altered image from said reference image and from at least one alteration parameter.

Thus, unlike the prior art techniques, the information is altered during the processing of the reference images, and this information, by that very fact, cannot be not be read subsequently.

According to one particular characteristic, the number of altered images is greater than or equal to three.

Thus, a first level of securing is attained since when a minimum of three altered images are needed to order to hope to obtain an indication of the information present in this image.

According to one particular characteristic, the number of altered images is greater than or equal to a frequency of display of the image of the screen on which said altered images must be displayed.

Thus, when these altered images are displayed, they produce a remanence effect either on the display screen or on the retina of the eye of the user viewing said display screen.

According to one particular characteristic, said step for generating at least one altered image implements at least one procedure of alteration among the following functions:
extracting portions of said reference image delivering at least altered image;
adding noise to said reference image delivering at least one altered image.

Thus, several methods of alteration can be used, alone or in combination, to produce a set of altered images from the original image, and this has the advantage of not allowing an attacker to make a guess in advance as to what will be the method used.

According to one particular embodiment, said function of adding noise to said reference image delivering at least one altered image comprises, for a plurality of pixels of the reference image, the application of the following expression:

$$D_t(x,y) = A\text{thr}(F(T(x,y)))$$

wherein:
A represents a value of assigning;
$D_t(x,y)$ represents the pixel having co-ordinates (x,y) of the altered image $D_t$;
Thr is a thresholding function;
F is a contrast function; and
T(x,y) represents the pixel having co-ordinates (x,y) of the reference image denoted T.

Thus, the reference images is altered by using the reference pixels as an entry of a alteration procedure in order to obtain the pixels of the altered image.

According to one particular characteristic, said contrast function is:

$$F(x) = \frac{\alpha x + \beta}{255\alpha + \beta} + \gamma$$

wherein:
α is a parameter of control of density of the altered image;
β is a contrast control parameter; and
γ is a noise-level control parameter.

Thus it is possible to adjust the contrast of an altered image in a parametrized or dynamic way: this makes it possible to adapt the contrast of an altered image to the conditions of implementation, especially as a function of the subsequent effect sought (especially in terms of readability, security and in relation to the characteristics of the screen).

According to one particular embodiment, said function for adding noise to said reference image delivering at least one altered image comprises the generation of a pre-determined number (K) of altered images by means of a altered image generator which, for each pixel (x, y) of the reference image, makes a processing distinction according to the color of said pixel, said processing distinction comprising:
the assigning of a same given random color for the corresponding pixels (x, y) of the (K) altered images when the color of the pixel (x, y) of the reference images is equal to a pre-determined color;
the assigning of a different random color for the corresponding pixels (x, y) of the (K) altered images when the color of the pixel (x, y) of the reference image is different from the pre-determined color.

Thus, in this embodiment, a set of altered images is generated in a single pass: such an implementation makes it possible to carry out a certain correlation of the images that compose this set of images and adjust this correlation in a single pass, which is advantageous from the viewpoint of procedure because it consumes less memory and/or computation power for the generation of a single image.

According to one particular embodiment, said method comprises at least one iteration of a step of display of said at least one altered image.

Thus, the successive displays of the altered images enable the production of the remanence effect. When this iterative display of the different altered images is implemented (each altered image is displayed once, and then another iteration of display is), a remanence effect is produced either directly on the screen on which the display is made (a screen that is not necessarily that of the electronic device implementing the present technique) or on the retina of the eyes of the user viewing this screen.

According to one particular embodiment, said at least one reference image represents a random or pseudo-random keypad to be displayed.

Thus, it is possible to generate a "remanent" version of the keypad to be displayed on the screen of a terminal or of a device. This "remanent" version of the keypad is thus constituted by a plurality of altered images which, taken in isolation, are incapable of providing information to a hacker on the real position of the random keys of the keypad and are therefore incapable of informing the attacker about the location of the keys of the keypad. This resolves a certain number of security problems currently encountered in the display of keypads on touch-sensitive entry device.

According to another aspect, a device is also described for the processing of display data, said display data representing at least one piece of information to be displayed on a screen. Such a device comprises:
means for obtaining a reference image representing said at least one piece of information to be displayed;
means for generating at least one altered image from said reference image and from at least one alteration parameter.

The altered images generated can then be displayed either by the device (if it has display means) or else by another device to which the generated images are transmitted (either in advance or along with the flow of operations according to the display requirements of the device).

According to a preferred implementation, the different steps of the methods according to the proposed technique are implemented by one or more software programs or computer programs, comprising software instructions intended for execution by a data processor of a relay module according to the proposed technique and being designed to command the execution of the different steps of the methods.

The invention is therefore also aimed at providing a program that can be executed by a computer or by a data processor, this program comprising instructions to command the execution of the steps of a method as mentioned here above.

This program can use any programming language whatsoever and be in the form of source code, object code or intermediate code between source code and object code such as in a partially compiled form or in any other desirable form whatsoever.

The proposed technique is also aimed at providing an information carrier readable by a data processor and comprising instructions of a program as mentioned here above.

The information carrier can be any entity or device whatsoever capable of storing the program. For example, the carrier can comprise a storage means such as a ROM, for example, a CD ROM or a microelectronic circuit ROM or again a magnetic recording means, for example a floppy disk or a hard disk drive.

Furthermore, the information carrier can be a transmissible carrier such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond, in this document, equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc.) and is capable of accessing hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the module concerned. It can be a programmable hardware component or a component with an integrated processor for the execution of software, for example, an integrated circuit, a smart card, a memory card, an electronic board for the execution of a piece of firmware etc.

Each component of the system described here above implements of course its own software modules.

The different embodiments mentioned here above and the different characteristics that constitute them can be combined with one another to implement the invention.

4. FIGURES

Figure 2:
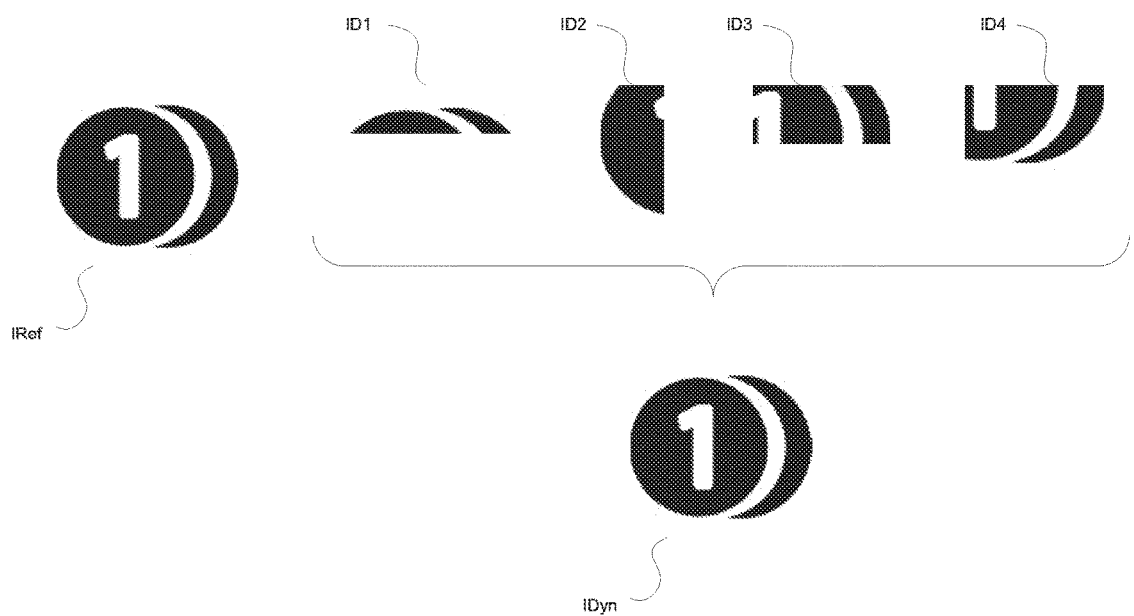
Figure 3:
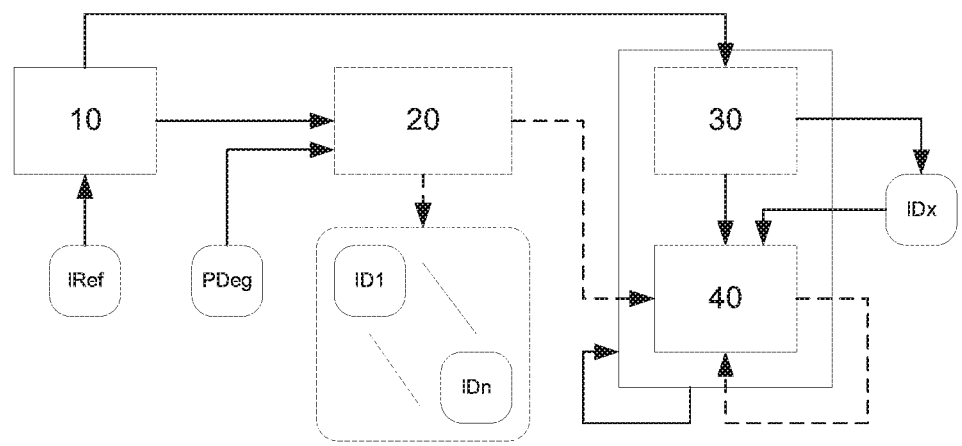
Figure 4:
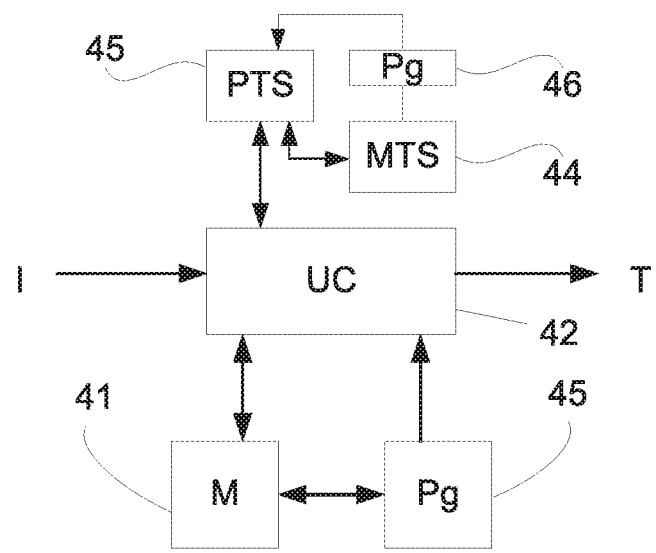

Other features and advantages of the invention shall appear more clearly from the following description of a preferred embodiment, given by way of a simple, illustrative and non-exhaustive example and from the appended drawings, of which:

FIG. 1 presents a first example of alteration or altering of images according to a first technique;

FIG. 2 presents a second example of alteration of images according to a second technique;

FIG. 3 describes the implementing of the first technique from a general point of view;

FIG. 4 discloses a communications terminal, shown in the form of a block diagram, terminal being capable of implementing the methods disclosed.

5. DESCRIPTION

5.1. General Principle

The general principle of the present technique consists in altering (degrading or modulating) the information before it is displayed on a screen (of a terminal or display device). More particularly, as explained here above, the subsequent perception of the modulated (or altered) information makes use of a physiological phenomenon called "retinal persistence" and/or a physical phenomenon of persistence of the image on the screen (depending on the characteristics of the display screen). As regards the example of the entry of sensitive data, using this phenomenon and modulating the display (for example a display of the random keyboard), the user accurately perceives (distinguishes) what is displayed (i.e. for example the random keypad). On the contrary, a malicious application has only partial information (image by image for example): this information cannot be used to deduce any information whatsoever on the layout and/or the information (for example the keys of the keypad) displayed on the screen. The proposed technique however is not limited solely to this case of display of a random keypad.

In one particular case, it is assumed that the information to be displayed on the screen takes the form of an image, an image that comprises for example a set of keys of a keypad. The image can advantageously have a random keypad, the order of the keys of which is defined as a function of a pre-determined random factor: this determining of the random factor, and therefore of the order of the keys on the keypad, can be done when generating the image of the keypad itself.

The disclosed technique relates to the smart alteration of the image with a subsequent purpose of displaying altered images. The invention however is in no way limited to this sole function of subsequent display but can also be implemented in other types of methods or fields relating to the securing of a piece of information.

As explained here below, several different techniques can be used to modulate the display of information on the screen. These techniques include several different classes:
- a first class is based on the iterative display of random portions of the image; at a given instant, a portion of the image is displayed on the screen: this random portion is also defined as a function of a random factor that is obtained during the display procedure; at the following instant, another random portion of the image is displayed on the screen; and so on and so forth throughout the display of this screen;
- a second class is based on the iterative display of full images (i.e. a complete image) each full image representing a variation of the original image: at each iteration, it is an altered image that is displayed on the screen, this altered image resulting from a processing carried out on the original image, in order to alter it;

a third class consists in mixing the two techniques described here above.

These techniques have in common the following characteristic: the (fixed) display of the original image is replaced by an iterative display of a plurality of versions known as altered versions (sub-divided and/or modified versions) of the original image (reference image). The iteration of the display is implemented in order to produce a remanence on the user's retina and/or on the display screen, resulting from the superimposition of the plurality of the altered versions, this remanence enabling the effective recognition (or distinguishing or guessing) of the original image (and therefore enabling the necessary entry operations to be carried out if need be). The remnant image is also called a dynamic image.

FIG. 1 presents the second class of display techniques in which a reference image (IRef) is used to produce several altered images (I1, I2, I3), these altered images being a variation of the original image. None of these altered images (I1, I2, I3), individually enables the recognition of the original image. For the purposes of illustration, a dynamic image (IDyn) resulting from the superimposition of all three altered images (I1, I2, I3) is also displayed. This dynamic image gives a sharper view of the digit 1 of the original image.

FIG. 2 presents the first class of the display technique in which a reference image (IRef) is used to produce several altered images (I1, I2, I3, I4), these altered images each being a random portion of the original image. None of these altered images, (I1, I2, I3, I4), taken individually, enables recognition of the original image. For the purposes of illustration, a dynamic image (IDyn) resulting from the superimposition of the four altered images (I1, I2, I3, I4) is also displayed. In this example of FIG. 2, the portions of the original image are continuous (to facilitate the building of the figure). Naturally, in a concrete implementation, the portions of the original image are randomly obtained as a function of random parameters. It is therefore quite possible (and desirable for reasons of robustness of the process) that the image portions (the altered images I1, . . . , In) should correspond to a sub-set of pixels of the original image, a sub-set that is partially or totally not continuous, corresponding to a random draw of an equally a random number of pixels in the original image.

According to the standards in force, the display of a piece of data on a screen is done at a speed of about 30 images per second. Certain devices have higher display frequencies. However, a display is generally considered to be perceived (by the human eye) as being right starting from a frequency of 24 images per second. The remanence effect on the retina is perceived from this frequency onwards.

Whatever the technique used, the general method of display presented with reference to FIG. 3 comprises the following steps:

a step (10) for obtaining a reference image (IRef) representing at least one piece of information to be displayed;

optionally, obtaining (20) at least one altered image (ID1, . . . , IDn) as a function of said reference image (IRef) and at least one alteration parameter (PDeg) (also called a random parameter);

carrying out at least one iteration of the following steps:
  obtaining (30) a altered image (IDx) (optionally depending on said reference image (IRef)) and at least one alteration parameter (PDeg), when this obtaining has not been done prior to the iterations or has been done directly in drawing from the images obtained at the step 20);
  displaying (40) said altered image (IDx);

Depending on the embodiments, the iterations for obtaining altered images can be implemented concomitantly with or prior to the iterations of displays. In other words, the obtaining of the altered images (potentially in an iterative manner) can precede the iterative display of these images.

In at least one embodiment, the obtaining of the altered images is implemented in a probabilistic manner. More particularly, the obtaining of the altered images from the reference image is implemented as a function of at least one probabilistic alteration procedure. The advantage of this solution is that, statistically, the phenomenon of retinal persistence enables the user to read, or at the very least to guess, the information displayed on the screen and, therefore, when the reference image is a random keypad, to read or guess where the digits of this random keyboard are positioned. It can be noted that the proposed technique can be applied not only to the implementing of a masking of a random keypad but also to the masking all types of sensitive information that must be displayed on a screen, and for which it is not desired that this information should be capable of interception by means of a screen copy, this screen copy being made for example done by a malicious software program.

The number of altered images generated also depends on the embodiment, especially on the computing power of the device that implements the described technique, the frequency of display of the screen (from 24 Hz to 60 Hz) and therefore the number of images displayed on the screen per second.

The invention thus consists in replacing the original static image (reference image) by a dynamic image generated from the static image (the dynamic image being the resultant of the succession of altered images): the dynamic image can be compared to a video or at least to a stream. This dynamic image is generated in such a way that the users can easily see or guess the content, by persistence that is either retinal persistence or hardware persistence (owing to the persistence of the display screen for example). At the same time, no altered image gives sufficient information on the reference image. The origin of this persistence is that the images displayed in rapid succession are superimposed. This corresponds to a mathematical average of the previous images (frames).

The dynamic image is therefore generated in such a way that the average of successive frames (of images) enables the (visual) perception of the reference image or of an image reasonably close to this reference image. However, the malicious computer programs can, in most cases, capture only one frame at a time (i.e. the graphic buffer memory) corresponding to a single altered image or at most to a few spaced out frames (for example using retroscope software) frames but nothing close to the capture of the display frequency of the screen, i.e. 24 Hz to 60 Hz;

When the technique for obtaining altered image is probabilistic, it is possible to verify the security of each image generated before using it. For example, the original image can be generated from one of the techniques described in the present application (with an extremely low probability of course).

This can be prevented by using an algorithm that can be used by the hacker. For example, in the case of the keypad, it would be, for example, an optical character recognition algorithm (or other hacking algorithms adapted to the particular situation of the information displayed). Before displaying an image, it is therefore possible to execute one of these recognition algorithms and verify that it has failed (to recognize one or more characters) before using the generated image. It can be noted that since the hacking algorithm (the optical character recognition algorithm) usually delivers a measurement of confidence (that is more precise than a yes/no measurement) it is possible to combine several of these algorithms to measure the security (in using for example a softmax algorithm or a mean).

The proposed solution has the obvious advantage of being easy to integrate as an additional layer of protection of the display and/or of data entry on a touch screen. For the problems of entering identification or authentication information (for example scrambled images as in CATPCHA type entry processes) and for the wider problem of authentication on open third-party devices (for example on a random visual keypad), one solution of the invention makes it possible to obtain protection against a spy software program using a malicious application.

Another advantage of this technique is that it exploits an intrinsic property of the human eye, and therefore requires no additional material or software component for users. In this sense, it is far less dependent on technology than other techniques.

5.2. Description of a First Embodiment

A description is given of a first embodiment of the technique explained here above wherein, according to a first variant, the reference image T is a grayscale image.

A reference image T is considered to be represented as a table with NxM integers. The notation $T(x,y)$ is used to designate the value of the pixel in the position $(x,y)$ in the image T. The convention chosen is that $T(x,y)=0$ if this pixel is black and $T(x,y)=255$ if the pixel is white. This can be adapted to correspond to the range of contrast of the screen if necessary.

The purpose is to define the content of at least one altered image Dt having identical dimensions (NxM) so that the average of several occurrences (K) of images Dt gives an approximation of the reference image T. It can be noted that Dt depends implicitly on time—in fact we describe a generator for Dt that is probabilistic and will therefore produce a different Dt each time it is called. In this embodiment, arbitrarily, we choose K=32 for the reference, but any other number whatsoever can be chosen according to the situation as a function for example of the characteristics of the display screen.

It is also assumed that we have available a probabilistic generator Rnd( ) that sends back a random or pseudo-random number ranging from 0 to 1, by using one of the well-known techniques to achieve this. The probabilistic generator is defined:

$$thr(r) \leftarrow 1_{Rnd(\ )<r}$$

Wherein $1_A$ is the indicatrix on A. In other words, thr(r) returns 1 if Rnd( )<r, and else 0. Then, each pixel of a altered image Dt is computed as:

$$D_t(x,y)=255 thr(F(T(x,y)))$$

Wherein F(x) is a contrast function. The role of the function F is to control the contrast and noise parameters of the resultant image of the superimposition of the altered images (called a dynamic image). This function, in this embodiment, is the following:

$$F(x) = \frac{\alpha x + \beta}{255\alpha + \beta} + \gamma$$

The parameter α (gradient) controls the density of the resultant image, β (level) controls the contrast and γ (noise) controls the noise level. These parameters are adjusted to attain the desired effect. More particularly, they can be obtained for example by minimizing the constraint error:

$$Err(\alpha, \beta, \gamma) = \sum_{x,y}^{N,M} \left\| T(x,y) - \frac{255}{32} \sum_{t=1}^{32} thr(F(T(x,y))) \right\|^2 + \mu(T(x,y)-c)^2$$

an equation wherein μ is a constant that settles the question of whether the altered image resembles the starting image to a greater or to a lesser extent (for example it is a Lagrange multiplier that determines the force of constraint of the dynamic image as an average of the value c (for example c=0)). In other words, μ is a value that enables a setting of the altered image to be made: μ makes it possible to know whether it is desired that the altered image should resemble the reference image to a greater degree or to a lesser degree.

This problem of optimization can be resolved by using generic methods. In this embodiment, the inventors suggest the use of the following parameters:

$$\alpha=1/255, \beta=0.3, \gamma=0.1.$$

It is seen that the values of these parameters can be adapted by using different statistical measurements. For example, it is possible to use the mutual information that measures dependency between two random variables. It is therefore possible to have the goal of minimizing the mutual information of the random variables used to generate the altered images and of the observed random variable representing the reference image T.

A non-linear constraint function can also be used to adjust to the Gamma layer of the screen, should that be necessary.

An extension of the technique presented here above can also be implemented for a reference color image. In this case, each pixel of the reference image T is represented by a color vector, a 3D vector of which each dimension represents a value of color. The following expression can then be implemented to compute the value of each pixel $(x,y)$ of the altered image:

$$D_t(x,y)=T(x,y) thr(F(T(x,y)))$$

In this embodiment, whether in the case of color processing or in that of gray-level processing, the altered images Dt are generated at a speed enabling them to be displayed at K images per second.

In general (in terms of color or gray levels), the value of each pixel is defined by the expression:

$$D_t(x,y)=A \cdot thr(F(T(x,y))),$$

wherein A represents an assigning value (127, 255, T(x,y)) depending on the context of implementation.

This first embodiment is described on the basis of an integral modification of the reference image. It is clear however that, depending on real operational conditions of implementation, only one or more parts of the reference image can be used. For example, when the reference image comprises portions that do not include any information on the context (no contextual information, for example no text), it is quite possible to envisage not modifying these parts of the image during the generation of the altered images and to envisage limiting, either approximately or not, the modification of the portions (or locations) in which the pieces of information are present. This is also valid for all the other embodiments and variants.

5.3. Description of a Second Embodiment

A second embodiment of the technique put forward here above is described, wherein a second generator of altered images is used. This embodiment uses a generator arbitrarily called USk(T) that creates a plurality (K) of altered images from a reference image T. For the following explanation, it has been arbitrarily chosen to limit the variable K to the value 3. It is clearly understood that, as in the case of the previous embodiment, this value can be adapted especially to the parameters of the display screen and especially the display frequency and/or the perception of remanence by (the eyes of) the user. It is understood, as in the case of the previous embodiment, that the images are rectangular and that they have a pre-defined size. The pixel having co-ordinates (0,0) represents the pixel to the top left of the image. It is also assumed that the device has means for displaying color, for example according to the RGB format. The technique described can however easily be implemented in other types of format, whether in color or in black and white. Be that as it may, given the RGB format, the color of a pixel is encoded according to the following expression:

$$R+(G+(B<<8)<<8)$$

with respectively R, G and B being variables ranging from 0 to 255 and the operator<<representing the operation of leftward shift of a number of bits (in this case 8).

The reasoning that underlines the implementation of this generator USk(T), and for example Us3(T) (when three altered images are generated) is that this generator is called for a pre-determined number of times per second (for example 8 times per second for Us3(T)) to make sure that the phenomenon of remanence is sufficient). Depending on the frequency of display, it is also possible to call the generator more frequently. Depending on the embodiments, it is also possible to pre-compute images on the basis of the generator and to repeat the display of these images although this solution is less secure (especially when the display frequency is high and when the value of K is low). The generator USk(T) generates color (or gray) frames that are randomly uniform. In general, in this embodiment, the method of adding noise to the reference image (IRef) comprises the generation of a pre-determined number (K) of altered images by means of a generator of altered images (Usk) implementing, for each pixel (x,y) of the reference image, a processing distinction according to the color of the pixel, the processing distinction comprising:

the assigning of a same given random color for the corresponding pixels (x,y) of the (K) altered images when the color of the pixel (x,y) of the reference image is equal to a pre-determined color;

the assigning of a different random color for the corresponding pixels (x,y) of the (K) altered images when the color of the pixel (x,y) of the reference image is different from the pre-determined color.

5.3.1. First Variant (Saturated Image)

We shall describe a first variant, in "saturated" mode. This mode is easy to implement and consumes up to four bits of random characters per image, which is little. This mode is therefore well suited to devices that do not have extended processing capacities. In this variant, the invention implements a function known as a random choice function that selects an element uniformly at random from the collection provided.

This mode generates only totally saturated colors, i.e. it does not use intermediate tones. Other variants make use of this additional freedom, such as a second variant which shall be presented here below.

US3(T):

1. Create 3 frames $F_0$, ..., $F_2$ of same dimensions as T.
2. Let c[0] = 0, c[1] = 1, c[2] = 2
3. For each position (x,y) in T
   a. Let k = random.choice(0, 1, 2)
   b. if T(x,y) is black
     i. let c = $2^8 << 8^k$
     ii. let $F_0(x,y) = F_1(x,y) = F_2(x,y) = c$
   c. else
     i. switch (c[0], c[k])
     ii. k' = random.choice(0, 1)
     iii. switch (c[1], c[k'+1])
     iv. for each j = {0, 1, 2}, update $F_j(x,y) = 2^8 << 8^{c[j]}$.

5.3.2. Second Variant (Softer Image)

This following variant uses more of a visual spectrum but consumes up to 72 random bits per pixel. It is therefore not necessarily suited to devices having low processing capacity.

US3(T):

1. Create 3 frames $F_0$, ..., $F_2$ of same dimensions as T.
2. Let c[0] = 0, c[1] = 1, c[2] = 2
3. For each position (x,y) in T
   a. if img(x,y) is black:
     i. let uR = random.choice(0, ..., 127)
     ii. let uG = random.choice(0, ..., 127)
     iii. let uB = random.choice(0, ..., 127)
     iv. let c = uR + (uG + (uB << 8) << 8)
     v. update $F_0(x,y) = F_1(x,y) = F_2(x,y) = c$
   b. else
     i. for each j in {0, 1, 2}
       1. let uR = random.choice(0, ..., 255)
       2. let uG = random.choice(0, ..., 255)
       3. let uB = random.choice(0, ..., 255)
       4. c = uR + (uG + (uB << 8) << 8)
       5. update $F_j(x,y) = c$.

5.3.3. Principle of Operation

In the two above variants, the underlying principle is that of correlation. The successive frames having low correlation approach one another, resulting in a light gray (which encodes the white values in T). The successive frames that have high correlation mutually reinforce one another mutually, giving stronger tint (which encodes the black values in T). Be that as it may, at the end of this implementation, three images are generated and they can be displayed one after the other and then the algorithm is again executed in order to generate three new altered images.

5.4. Other Variants

A description is provided here of the variants of the preliminarily exposed embodiments. One goal of the embodiments and variants presented here above was that a human reader should be capable of reading an image without its being possible for a computer to do so. In certain applications, such as random keypads, it is possible to lower the level of readability and to make it possible to distinguish only the digits displayed. It can be hoped that the user will distinguish the number written on each key and that this task will be impossible for the computer. Thus, it is possible not to add a uniformly random noise in the image but on the contrary to add a random noise generated from one or more previously obtained altered or degraded images and/or from the reference image (or other reference images when several reference images are used).

A first variant of the first embodiment that makes it possible to distinguish only the digits of one image comprises the replacement, in the function F defined here above (for memory $$F(x) = \left(\frac{\alpha x + \beta}{255\alpha + \beta} + \gamma\right),$$

of the constant γ by a function γ(x) in which x is the position of the pixel.

Through this modification, the darker the pixel on the sum of all the images that are different from the one that we are scrambling, the greater is the probability of the appearance of the pixel. For example, for three images T_1, T_2, T_3, the noise T_1 could be a linear function (T_2+T_3) or again more generally a function of (T_2, T_3) which for example can be a function increasing along both variables to increase the security of the method. In practice, in order to maximize the security of the method, the function of (T_2, T_3) is increasing on both variables.

A second variant of the second embodiment, making it possible to distinguish the digits of an image, comprises only the replacement of the random function (which, it may be recalled, is known as "random choice"), so that this function can take account of the preceding images and is no longer a uniform function. To this end, the previously described algorithm ((Usk(T)), takes as an argument, in addition to the reference image, one or more previously obtained images (in one or more previous iterations of the algorithm) and/or one or more images given additionally. The random.choice function for its part can take, as an argument, (x,y) co-ordinates of points belonging to these previous images. In general (both for this variant and for the previously described embodiment), the random.choice function can be chosen from amongst a large variety of functions. It is possible to add a constraint thereto according to which the pixel obtained at the end by the function is, on an average, close enough to the corresponding pixels of the other images.

The mutual information, in the case of the use of groups of images (as in the above two variants) can, in another variant, be used more efficiently, in measuring the mutual information of all the pairs of images (in measuring the correlation of the random variables representing each image). It is then possible to combine all these measurements (the random variables of images) into a single measurement for which it is sought to make a minimization.

For example, if it is desired to measure the level of security of three images produced successively (by any one of the methods presented here above), the invention uses the mutual information between two pairs of images of the group of images. Let us assume that three images 1, 2 and 3 are available. I(X,Y) denotes the mutual information between two images (X and Y). The following pieces of mutual information are computed: I(0,1),I(0,2),I(1,2). Then, these pieces of information are combined, for example by performing the following computations: I_0=min(I(0,1),I(0,2)), I_1=min (I(1,0),I(1,2)), and I_2=min (I(2,0),I(2,1)). Each of these quantities I_i delivers a piece of information on the difficulty of knowing whether the image is correlated with (derived from) the image i. To arrive at this result, it is necessary to have a random image variable of a current image distant from the random variable of the images with which the comparison is made. Then, the following computation max(I_0,I_1,I_2) is carried out. This computation makes it possible to determine whether the images generated are sufficiently secured (i.e. that it is not possible to guess that an altered image is derived from another image, that it is itself altered or that it is a reference image).

5.5. Other Features and Advantages

Referring to FIG. 4, we describe a terminal implemented to manage the production of a plurality of altered images from a reference image representing information to be displayed on the screen.

For example, the terminal comprises a memory 41 comprising for example a buffer memory, a general processor 42, equipped for example with a microprocessor and controlled by a computer program 43 and/or a secured memory 44, a secured processor 45, controlled by a computer program 46, these processing units implementing data-processing methods as described here above to carry out a conversion of a reference image into a plurality of altered images as a function of at least one alteration parameter (also called a degradation or a random parameter).

At initialization, the code instruction of the computer program 46 are for example loaded into a memory and then executed by the secured processor 45. The processor 45 inputs at least one piece of data representing information to be displayed on the screen. The secured processor 45 implements the steps of the method, especially to obtain a reference image (this reference image can be generated directly by the secured processor or it can be downloaded from the secured memory) and then to generate at least one altered image from the reference image and, optionally, command the iterative display of altered images according to the instructions of the computer program 46 to obtain a phenomenon of remanence of the information of the reference image, directly (through the display screen) or not directly (through the retina of the user's eyes). To this end, the terminal comprises, in addition to the memory 44, communications means such as network communications modules, data transmission means and data transmission circuits between the various components of the terminal.

The terminal (or the device implementing the techniques described) also has all the means needed to implement the methods, embodiments and variants described here above.

The means described here above can take the form of a particular processor implemented within a specific device implanted within the terminal. According to one particular embodiment, the terminal carries out a particular application that is in charge of carrying out the operations described here above, this application being for example given by the manufacturer of the processor in question in order to enable the use of said processor. To this end, the processor comprises unique means of identification. These unique means of identification make it possible to ensure the authenticity of the processor.

The invention claimed is:
1. A method comprising:
processing display data by an electronic data processing device, said display data representing at least one piece of information to be displayed on a screen, wherein the processing comprises:

obtaining at least one reference image representing said at least one piece of information to be displayed;

generating at least one altered image from said reference image and from at least one alteration parameter, implementing at least one procedure of adding noise to said reference image, comprising generation of a pre-determined number of altered images by using an altered image generator which, for each pixel of the reference image, carries out a processing distinction according to a color of said pixel, said processing distinction comprising:

assigning a same given random color for the corresponding pixels of the altered images when the color of the pixel of the reference image is equal to a pre-determined color; and the assigning a different random color for the corresponding pixels of the altered images when the color of the pixel of the reference image is different from the pre-determined color.

2. The method according to claim 1, wherein the number of altered images is greater than or equal to three.

3. The method according to claim 1, wherein the number of altered images is greater than or equal to a frequency of display of the image of the screen on which said altered images must be displayed.

4. The method according to claim 1, wherein the generating at least one altered image implements a procedure of extracting portions of said reference image delivering at least one altered image.

5. The method according to claim 1, wherein said function of adding noise to said reference image delivering at least one altered image comprises, for a plurality of pixels of the reference image, the application of the following expression:

$$D_t(x,y) = A \text{ thr } (F(T(x,y)))$$

wherein:

A represents a value of assigning;

$D_t$ (x, y) represents the pixel having co-ordinates (x, y) of the altered image $D_t$;

Thr is a thresholding function;

F is a contrast function; and

T (x, y) r represents the pixel having co-ordinates (x, y) of the reference image denoted T.

6. The method according to claim 5, wherein said contrast function is:

$$F(x) = \frac{\alpha x + \beta}{255\alpha + \beta} + \gamma$$

wherein:

α is a parameter of control of density of the altered image;

β is a contrast control parameter; and

γ is a noise-level control parameter.

7. The method according to claim 1, further comprising at least one iteration of a step of displaying said at least one altered image on the screen.

8. The method according to claim 1, wherein said at least one reference image represents a random keypad to be displayed.

9. A device comprising:

a processor; and a non-transitory computer-readable medium comprising instructions stored thereon, which when executed by the processor configure the processor to perform a method of processing of display data, said display data representing at least one piece of information to be displayed on a screen, wherein the processing comprises:

obtaining at least one reference image representing said at least one piece of information to be displayed;

generating at least one altered image from said reference image and from at least one alteration parameter, implementing at least one procedure of adding noise to said reference image, comprising generation of a pre-determined number of altered images by using an altered image generator which, for each pixel of the reference image, carries out a processing distinction according to a color of said pixel, said processing distinction comprising:

assigning a same given random color for the corresponding pixels of the altered images when the color of the pixel of the reference image is equal to a pre-determined color; and assigning a different random color for the corresponding pixels of the altered images when the color of the pixel of the reference image is different from the pre-determined color.

10. A non-transitory computer-readable medium comprising a computer program product comprising program code instructions which, when executed by a processor configure the processor to perform acts comprising:

processing display data, said display data representing at least one piece of information to be displayed on a screen, wherein the processing comprises:

obtaining at least one reference image representing said at least one piece of information to be displayed;

generating at least one altered image from said reference image and from at least one alteration parameter, implementing at least one procedure of adding noise to said reference image, comprising generation of a pre-determined number of altered images by using an altered image generator which, for each pixel of the reference image, carries out a processing distinction according to a color of said pixel, said processing distinction comprising:

assigning a same given random color for the corresponding pixels of the altered images when the color of the pixel of the reference image is equal to a pre-determined color; and assigning a different random color for the corresponding pixels of the altered images when the color of the pixel of the reference image is different from the pre-determined color.

\* \* \* \* \*

UNITED STATES PATENT AND TRADEMARK OFFICE
CERTIFICATE OF CORRECTION

PATENT NO. : 10,755,377 B2
APPLICATION NO. : 16/168161
DATED : August 25, 2020
INVENTOR(S) : Marc Beunardeau Page 1 of 1

It is certified that error appears in the above-identified patent and that said Letters Patent is hereby corrected as shown below:

In the Claims

Claim 1, Column 15, Line 16, delete "the" before the word "assigning"

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*